United States Patent [19]
Agrawal et al.

[11] Patent Number: 5,216,536
[45] Date of Patent: Jun. 1, 1993

[54] ENCAPSULATED ELECTROCHROMIC DEVICE AND METHOD FOR MAKING SAME

[75] Inventors: Anoop Agrawal; John P. Cronin; Raymond L. Zhang, all of Tucson, Ariz.

[73] Assignee: Donnelly Corporation, Holland, Mich.

[21] Appl. No.: 798,622

[22] Filed: Nov. 26, 1991

[51] Int. Cl.$^5$ .......................... G02F 1/15; G02F 1/153
[52] U.S. Cl. ..................................... 359/274; 359/265; 359/272
[58] Field of Search .................... 359/265, 272, 274

[56] References Cited

U.S. PATENT DOCUMENTS

| | | | |
|---|---|---|---|
| 3,521,941 | 7/1970 | Deb et al. | 359/275 |
| 3,712,710 | 1/1973 | Castellion et al. | 359/267 |
| 3,829,196 | 8/1974 | Deb | 359/275 |
| 3,844,636 | 10/1974 | Maricle et al. | 359/267 |
| 4,227,779 | 10/1980 | Bissar et al. | 359/274 |
| 4,297,006 | 10/1981 | Bissar | 359/274 |
| 4,392,720 | 7/1983 | Ganguillet et al. | 359/265 |
| 4,465,339 | 8/1984 | Baucke et al. | 359/274 |
| 4,483,831 | 9/1984 | Amano | 423/175 |
| 4,852,979 | 8/1989 | Agrawal | 359/274 |
| 5,136,419 | 8/1972 | Shabrang | 359/265 |

FOREIGN PATENT DOCUMENTS

| | | | |
|---|---|---|---|
| 5891431 | 5/1983 | Japan . | |
| 58-211123 | 8/1983 | Japan . | |
| 0115916 | 6/1985 | Japan | 359/274 |
| 0194432 | 10/1985 | Japan | 359/274 |
| 0040432 | 2/1987 | Japan | 359/274 |

*Primary Examiner*—Bruce Y. Arnold
*Assistant Examiner*—Evelyn A. Lester
*Attorney, Agent, or Firm*—Price, Heneveld, Cooper, DeWitt & Litton

[57] ABSTRACT

The performance and operating characteristics of electrochromic devices may be improved by the incorporation of a moisture control layer comprised of either water reservoir material or water scavenger material in conjunction with a moisture permeable intermediate barrier layer within the device. The water reservoir material provides a source of water for those electrochromic stacks which require water for proper operation. For stacks which require protection from moisture, water scavenger material may be utilized. A moisture permeable intermediate barrier layer separates the moisture control layer from the electrochromic stack. The invention is also directed towards methods of incorporating such layers into electrochromic devices during their manufacture.

26 Claims, 5 Drawing Sheets

ENCAPSULATED ELECTROCHROMIC DEVICE AND METHOD FOR MAKING SAME

BACKGROUND OF THE INVENTION

This invention relates to light reflective and light transmissive electrochromic devices. More specifically it relates to an improved electrochromic device which is characterized by an increased resistance to environmental change. A transmissive electrochromic device is one which normally transmits light, but which can be activated to become opaque, either entirely across the surface of the device or across a portion of the surface, as for example when one wishes to display a message or the like. An electrochromic reflective device is a mirror which can be darkened to diminish reflectance and thereby minimize glare.

Electrochromic devices can be made by depositing an electrochromic stack on a transparent substrate, typically glass. The electrochromic stack itself typically comprises a first transparent conductive layer deposited on the substrate, followed by sequentially deposited layers to form a stack as follows: An electrochromic layer, an ion conductive layer, and another active layer (which may either be another electrochromic layer or a conductor layer). If the second active layer is itself electrochromic, it is covered by another conductive layer. In an electrochromic mirror a reflecting layer such as aluminum, stainless steel, chrome etc. is applied, which may double as the final conductive layer. A transparent or a semitransparent conductive layer such as ITO, gold etc. is used for a transmissive device.

The electrochromic layer works by an application of voltage across the cross section of the stack that causes ions such as $H^+$, $Li^+$, $Na^+$, $F^-$, $Ag^+$, $Cs^+$, or $OH^-$ etc. (or a mixture of them depending on the construction materials in the device) to diffuse from the ion conductor into the active layer(s) or from one active layer to another transported via the ionic conductor. These ions then react with the active layers to form differently colored chemical compounds. When a reverse voltage is applied (in some cases even if the two conductors sandwiching the device are shorted) the whole process is reversed such that the original state is resumed. Typical means of making electrochromic mirrors by this method are described in U.S. Pat. Nos. 3,712,710; 3,844,636 and 4,465,339 and methods for making displays are disclosed in U.S. Pat. No. 3,512,941.

Electrochromic devices are sensitive to their environment as the transport properties of the ions and even the presence of some of these ions required for the electrochromic phenomena, depends upon the humidity in the environment. To prolong the life of electrochromic devices, or to render them insensitive to the surrounding environment, or to preserve their performance at temperatures above ambient, one has to encapsulate such devices.

U.S. Pat. No. 4,852,979 discloses an encapsulated electrochromic mirror comprising a shatterproof backing about the device and a hermetic seal which protects the mirror from environmental factors.

Japanese Application No. 58-91431(A) discloses a solid state electrochromic display stack, comprising a series of thin films deposited onto a glass substrate which is sealed to protect the device from the ambient environment. The exposed surfaces of the films are covered with a xylene polymer, which is itself covered with a reaction curing-type resin such as an epoxy resin to which a solid protecting plate can be adhered.

U.S. Pat. No. 4,465,339 to Baucke et al. discloses hermetically sealed electrochromic mirrors using an adhesive, such as an epoxide adhesive, applied over a stack of thin films, deposited onto a transparent glass substrate, preferably in combination with a solid glass, plastic or metal backing plate adhered to the adhesive film.

U.S. Pat. Nos. 4,392,720 to Ganguillet et al.; 4,227,779 to Bissar et al. and 4,403,831 to Amano disclose the use of adhesive resin or solder joints to seal the working elements of electrochromic display devices from the ambient environment.

However, some electrochromic device constructions require a certain amount of moisture in their structure to perform well. To address this issue so that the mirror does not dehydrate, Japanese Patent Application 58-211123(A) to Kawamura describes placing a hydrate resin layer in contact with the electrochromic layer stack. This is further encapsulated by a water impermeable layer. The hydrated layer is described as a liquid when processed which subsequently hardens. Water is incorporated in this layer either by curing in a moist environment, or exposing the layer to a moist environment after hardening, or soaking the layer in water after hardening and enclosing it in a water impermeable layer.

There are a number of deficiencies in these methods. First, large amounts of water cannot be incorporated in these layers because the materials are not naturally water absorbing. Therefore not only is their water content low, but their tendency to retain moisture is minimal. Second, if too much water is somehow forced into them (e.g. by subjecting them to steam or elevated temperatures), they may corrode the electrochromic stack due to their close proximity. Lastly, if curing of the hydrated layer is attempted in a high humidity environment, the humidity might interfere with the curing process.

Such techniques can be effective in providing some protection from the environment or retaining moisture for a limited time period due to finite diffusion of water through the organic materials. However, it would be desirable to improve upon the moisture protection of electrochromic devices or use alternative materials and designs so that moisture can be retained without any of the drawbacks mentioned earlier in describing Kawamura's invention.

SUMMARY OF THE INVENTION

In the electrochromic device of the present invention, a moisture control layer comprised of either hydrophilic water reservoir material, or alternatively water scavenger material, is separated from the electrochromic stack by a moisture permeable intermediate barrier layer. The incorporation of water reservoir material provides a source of water for those electrochromic stacks which require water for proper operation. For stacks which require protection from surrounding water, water scavenger material may be utilized. Thus, if any water leaks or migrates into the electrochromic device, the scavenger material will bind and store the water. The intermediate layer, when used in conjunction with water reservoir material allows permeation of water to the electrochromic stack while minimizing corrosion and adverse effects which could otherwise arise if water reservoir material were adjacent to the electrochromic stack. The intermediate layer, when used in either version of the present invention also facilitates manufacturing of the electrochromic device as it enables simultaneous assembly of both the upper and lower halves of the device, curing of an exposed reservoir or scavenger layer, and offers a greater degree of sealing between the mating surfaces of the halves.

DESCRIPTION OF THE PREFERRED EMBODIMENT

Figure 1:
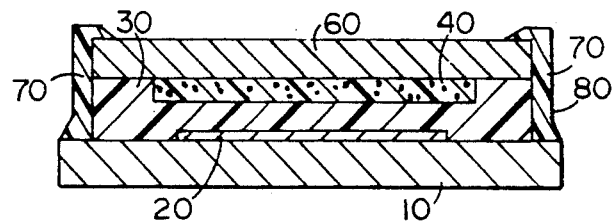
FIG. 1 is a schematic representation of a cross section of an encapsulated electrochromic device with primary and secondary seals, incorporating a moisture control layer.

The electrochromic device of the present invention illustrated in FIG. 1, comprises substrate 10 onto which an electrochromic stack 20 is deposited. The resulting assembly is then enclosed by an intermediate moisture permeable barrier layer 30. Moisture control layer 40 overlies barrier layer 30, and can be comprised of either water reservoir material or water scavenger material, depending upon whether the device operates better in the presence or absence of water. The reservoir material provides a source of water for the electrochromic device while the scavenger material collects water either by physically binding it or chemically reacting with it so that it is not released to surrounding portions of the device.

If water reservoir material is to be used in moisture control layer 40, one may subject the device to a certain humidity to absorb water before it is completely enclosed with backing plate 60 and primary seal 70. For incorporation of water scavenger material, one needs to ensure that the device is dry when sealed. Secondary seal 80, may be applied onto primary seal 70. This secondary seal is a low viscosity material which when hardens, seals any cracks or accidental gaps and provides further protection to the package from the environment.

Substrate 10 provides a base for the electrochromic device and will typically be glass. Additional materials may include polymeric materials and laminates. Thickness is not critical, so long as substrate 10 gives the device sufficient strength for its intended purpose, and the transport of water across the substrate's thickness is negligible.

Electrochromic stacks are well known in the art. Typically, such devices comprise thin layers of inorganic oxides that change color upon the application of an electric field, maintain the changed condition after the field is switched off, and return to the original state after pole reversal. Examples of electrochromic materials are tungsten trioxide and molybdenum trioxide. The following description of stack 20 is merely exemplary and is not critical to the essence of the invention.

Electrochromic stack 20, is formed by successive deposition of various layers to form a stack. The first layer deposited on substrate 10 is a conductive layer. The conductive layer can be on any conventional electroconductive coating, such as indium-tin oxide, tin oxide or cadmium stannate. The thickness of this layer is not critical, so long as it adequately conducts electricity across its entire surface. Also, its thickness should be selected so that the transmission of light through the electroconductive layer is maximized. The conductive layer is generally from about 300 to 3000 angstroms in thickness.

The second layer applied is an anodic electrochromic material which colors when electrically connected to a positive electrode. Typically, nickel oxide may be employed as the anodic electrochromic material. The thickness of this layer varies depending upon the anodic material selected and the intended use of the stack. If it is too thick, the electrochromic stack will have a low transparency (or diminished reflectivity if the application is for a mirror). Additionally, the electrochromic stack may become too slow in changing from one state to the other if this anodic layer is too thick. On the other hand, if the anodic layer is too thin, the stack may not color or darken sufficiently. A typical thickness range is from 100 to 1000 angstroms.

The next layer applied is a solid electrolytic layer. This layer serves to isolate the anodic and cathodic electrochromic layers. As such, it must be ion conducting, electron insulating, clear and must remain clear during polarity reversal of the electrochromic layers. Suitable materials include tantalum pentoxide, cesium oxide, aluminum oxide, magnesium fluoride, silicon dioxide and mixtures thereof. Tantalum pentoxide is the most preferred material. The thickness of this layer typically ranges from 750 to 2000 angstroms.

The next layer applied is a cathodic electrochromic material, typically tungsten oxide. Cathodic electrochromic materials are those which color when connected to a negative electrode. Thus when the stack is subjected to an appropriate potential difference, both the nickel hydroxide and tungsten oxide layers will color. When that potential is reversed, both layers will clear. The thickness of the tungsten oxide layer varies also as a function of intended use. If too thick, the stack may respond too slowly to changes in light and will always be too dark. Transparency or reflectivity will not be sufficient. If the layer is too thin, the stack will not color sufficiently. A typical thickness is from 500 to 6000 angstroms.

Finally, a conductive layer is applied. It is important only that this layer be sufficiently thick that it conducts readily over its entire surface and cannot be easily damaged. If the electrochromic stack is to be employed in a mirror, this layer should also have sufficient reflective characteristics. Typically, aluminum is employed for this layer. The aluminum layer serves both to reflect incident light and to conduct electricity to the tungsten oxide electrochromic layer.

The various layers in the electrochromic stack of the present invention can be deposited in any conventional manner. Different deposition methods can be employed for different layers. Such techniques are well-known to those skilled in the art for all of the materials used in the present invention. Common modes of fabrication of the anodic and cathodic electrochromic layers, and electrolyte insulating layer, include evaporation and sputter deposition. Dip and spray coating of organo-metallic compounds, followed by firing in air, has also been used. The starting materials include high purity tungsten oxide, nickel oxide and tantalum pentoxide.

In a nickel oxide device, the availability of moisture during the manufacturing process is critical to ultimate device performance in order to facilitate conversion of the nickel oxide to nickel oxy-hydroxide during coloration. On the other hand, in a lithium based electrochromic device it is important to keep moisture out of the processing environment.

Moisture permeable intermediate barrier layer 30, serves to separate moisture control layer 40 from electrochromic stack 20 In the case of using a water reservoir material, intermediate layer 30 prevents corrosion of stack 20 and adverse effects that may occur due to excessive amounts of water, by separating the reservoir material from stack 20. Intermediate layer 30 may also exhibit shock or impact absorbing characteristics. Intermediate layer 30, should be of sufficient dimensions to adequately cover the electrochromic stack situated below it. This allows a uniform water supply (where water reservoir material is employed), or moisture sink (where water scavenger material is used) over the stack area. Finally, such coverage improves protection of stack 20 from shock or impacts.

Intermediate layer 30 must be sufficiently water permeable to allow migration of water into and out of moisture control layer 40. The water permeability of intermediate layer 30 is in the range of 0.005 to 10 mg/cm-mm$^2$-day, and a more preferred range is between 0.05 and 1 mg/cm-mm$^2$-day.

Intermediate layer 30 should be hydrophobic or water resistant in nature, but as previously mentioned, should allow a limited degree of water passage between adjacent layers. Representative materials which may be used for the intermediate layer include organo-ceramics, epoxies, urethanes, ureas, acrylics, polyesters, silicones, vinyls, amides, imides or sulfones. As each material exhibits a particular degree of water permeability, layer thickness will vary with the material selected. Some experimentation will be required with each different material selected. A typical thickness of this layer made from an acrylic polymer was between 0.001 and 5 mm, but a preferred range was between 0.01 and 0.1 mm. In another experiment, the thickness of a silicone intermediate layer was between 0.01 to 5 mm, but a preferred range was between 0.05 and 0.3 mm. Thickness of intermediate layer 30 should be fairly uniform, so that transmission of water into or out of stack 20 is uniform across the total surface area of the stack. An exception would occur if for some reason one desired an electrochromic stack exhibiting differential performance across its surface area. A suitable material for use as intermediate layer 30 is GEL 527, a silicone, available from Dow Corning. The preferred material for intermediate layer 30 is a UV curable acrylated epoxy urethane such as B565, deposited on the surface of electrochromic stack 20.

Whether reservoir material or scavenger material is to be incorporated as moisture control layer 40 in the electrochromic device depends upon the effects of water on stack 20. If the electrochromic device requires water for its operation or exhibits an improved performance in the presence of water, a hydrated layer of reservoir material should be incorporated in the device. If the device performs better in the absence of water, water scavenger material should be employed. For example, a lithium based electrochromic stack would exhibit improved operating characteristics if used in conjunction with water scavenger material. This is due to the fact that a lithium electrochromic system utilizes diffusion of $Li^+$ ions from one active layer to another, not $H^+$ ions. Whereas in those systems relying on the transfer of $H^+$ ions, water reservoir material would most likely be beneficial.

Water reservoir material provides a source of water, upon being sufficiently hydrated Once the reservoir material has been incorporated into the electrochromic device but before a sealing layer applied, the device may be subjected to a high humidity environment. Such exposure will hydrate the reservoir material by absorption of surrounding water.

The reservoir material will tend to retain such water although allowing a limited drainage to the surrounding portions of the electrochromic device (primarily the stack), depending upon the overall permeability factor of intermediate layer 30. Moisture control layer 40 comprised of reservoir material should have at least the same area dimensions as the electrochromic stack. This enables a uniform transfer of water across the surface of the stack. The initial water content of such reservoir material is typically in the range of 0.005 to 5 mg per $cm^2$ but preferably 0.05 to 0.5 mg of water per $cm^2$ of area of electrochromic stack 20 based upon a reservoir material layer thickness of 0.002 to 5 mm. A thickness of 0.02 to 1.0 mm will preferably be adequate to give such water levels for the materials discussed below.

There are principally two methods of forming the reservoir material in the present invention. The first is by the incorporation of hydrophilic fillers in a thermosetting or a thermoplastic resin. Such fillers should have the ability to absorb many times their own weight of water. The second method is by incorporating hydrophilic groups in a polymer. Such groups can combine with or liberate water depending on the environmental conditions. Examples of suitable hydrophilic groups are: amines, amides, hydroxides, carboxylic acids, acids, sulfones, and ethylene oxide-based ethers.

An example of a hydrophilic filler material in a thermosetting resin is a cross-linked polyacrylamide (filler) in a silicone resin. A lightly cross-linked polyacrylamide, AQUASTORE is available from American Cyanamide in a powdered form. This material can absorb up to 500 times its volume in water. This is a good filler to be incorporated into a silicone resin because the latter has zero moisture absorption but allows the transport of water vapor. In addition if a silicone resin is chosen which is soft after curing, such as SYLGARD 170 (by Dow Corning), then the expansion of the filler due to water uptake will not cause large localized stresses. This would minimize cracking of the matrix. A typical reservoir material could be made by incorporating polyacrylamide powder in SYLGARD 170 such that it has adequate moisture absorbing properties.

An example of the second type of reservoir material described above may be a thermoplastic or can be made with a material that would cross-link with at least one of the hydrophilic network forming components. One example would be to mix a standard epoxy resin such as QUATREX 1010, an electronic grade based on BIS-PHENOL A available from DOW Chemical, with a water soluble amine (based on polyethylene oxide) such as JEFFAMINE ED600 from Texaco. The water content (or uptake) of the product can be varied in a number of ways for this system:

(i) changing the molecular weight of the type of epoxy (aliphatic epoxies, reactive diluents, Novalacs, etc)

(ii) by changing the molecular weight of the water soluble Jeffamine, or by using mixtures of the curing agents where at least one of the components in the mixture is a hydrophilic amine.

A preferred means of varying the water content of the reservoir material is by (ii) i.e. mixing the water soluble amine with another less hydrophilic amine so that the hydrophilicity of the system can be controlled. The other curing agent that may be chosen is a propylene oxide based amine, D230 from Texaco. The preferred material for the reservoir material is an amine cured epoxy deposited upon intermediate layer 30 of the electrochromic device.

The water scavenger material functions to collect and bind any water within the electrochromic device. The scavenger material unlike the hydrophilic reservoir material, operates to permanently retain collected water, whereas the reservoir material allows a limited rate of water migration from the material to the surrounding portions of the electrochromic device.

A variety of phenomena operate for the retainment of water in the scavenger material. The scavenger material can operate by irreversibly reacting with water, thus removing it from the system. This irreversible reaction may be achieved by chemically modifying a polymer matrix to react with water or by the addition of hydroscopic filler additives to the polymer matrix which by an irreversible process react with or absorb water. Upon encapsulation, the scavenger material should be free of water. Total water capacity of such scavenger material depends upon the material selected, but the scavenger material should be capable of an uptake of about 0.5 to 50% by weight of water. Moisture control layer 40, when comprised of scavenger material should be of at least the same dimensions as the electrochromic stack 20. This ensures a uniform transfer and retainment of water throughout the electrochromic device. Scavenger material may be comprised of materials, or combinations of, selected from the following: epoxies, urethanes, ureas, acrylics, polyesters, amides, silicones, vinyls or imides.

The preferred embodiment for the scavenger material is found to be a polymeric material that is chemically modified to react irreversibly with water or a hydroscopic filler which by an irreversible process reacts with or absorbs water. The scavenger material should be deposited to a thickness of about the same as described for the reservoir layer upon intermediate layer 30 of the electrochromic device.

Backing plate 60 resides adjacent to moisture control layer 40. Backing plate 60 may be metallic, ceramic, glass, polymeric, or a combination depending upon the specific application. Backing plate 60 performs a sealing function and protects the lectrochromic device from environmental and mechanical damage by covering the entire exposed surface of the adjacent layer (i.e. either reservoir or scavenger material).

Primary seal 70 is then applied only on the edges, not over the entire area of backing plate 60 and onto the outer periphery of the resulting assembly to hermetically seal the electrochromic device from the ambient environment, thereby minimizing the transport of water to or from the electrochromic layers. The seal 70 should have the following properties; low water permeability and high water resistance, good adhesion to substrates such as glass, aluminum etc., and be preferably thixotropic. Small amounts of fumed silica such as 2% may be added to the seal material to increase its thixotropicity. This may be desirable where the seal material is found to not retain its shape upon application. In particular instances, seal 70 may even be the same material as intermediate layer 30, as seal 70 may provide good barrier properties if seal 70 coating thickness is large. For typical epoxy used as primary seal 70, the thickness was between 0.5 and 10 mm. Also if the same generic material is used for both applications (primary seal 70 and intermediate layer 30), they could have different intrinsic permeability properties. In example, an epoxy used for intermediate layer 30 could have a lower degree of cross-linking resulting in higher water permeability as compared to the epoxy used in the seal 70, which would have a high degree of cross-linking thus having naturally lower water permeability In addition to epoxy resins which are most preferred, suitable materials for forming primary seal 70 include acrylics, silicone-polyimides, metallic foil, films of glassy or crystalline hydrophobic polymers and combinations of the above. Examples of preferred epoxies are: ER2020 and CATALYST 15 manufactured by Columbus Adhesives; and XI931-ITINI by Ablestick. Examples of hydrophobic polymeric films are epoxies, polyolefins, polyester and polyvinylidene chloride.

Finally, secondary seal 80 may be applied. Secondary seal 80 is preferably applied around the entire outer perimeter of the electrochromic device, thereby completing the isolation of the electrochromic stack layers from the ambient environment. Secondary seal 80 is typically a low viscosity solution, emulsion or varnish which seals off any cracks or voids that may remain after the application of primary seal 70. Suitable secondary adhesive materials include urethanes, epoxies, silicones, polyvinylidene chloride emulsions, polyesters, acrylics and cross-linking varnishes containing silanes and titanates. Examples of secondary seal materials which may be used in the present invention include: CR3200, a polyurethane manufactured by Columbus Adhesives; B566 an acrylated epoxy urethane from DuPont; and SPI100, a silicone polyimide from GE. Currently preferred secondary adhesives are polyvinylidene chloride emulsions and the cross-linking varnishes.

Figure 2:
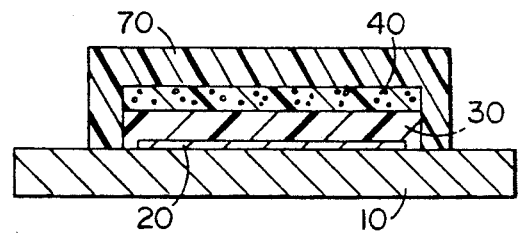
FIG. 2 is a schematic representation of a cross section of an alternative embodiment of an encapsulated electrochromic device incorporating a moisture control layer.

FIG. 2 shows a variation of the sealing scheme whereby backing plate 60 is eliminated. Primary sealing layer 70 then not only seals the electrochromic device, but also serves as a backing for the adjacent moisture control layer.

Figure 3:
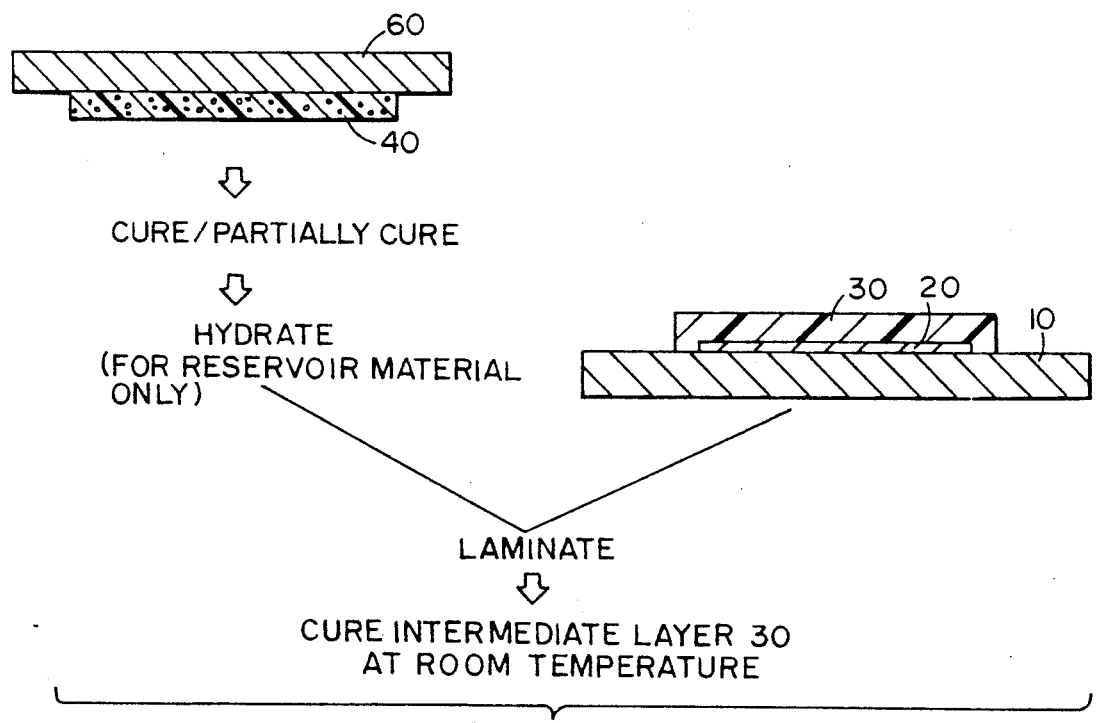
FIG. 3 is a flow diagram illustrating the method of manufacturing the device of the present invention.

In the preferred embodiment, two halves of the electrochromic device of the invention are assembled in parallel (FIG. 3). Upon completion of the halves, they are mated to one another, an uncured intermediate layer and a moisture control layer comprised of either reservoir or scavenger material providing the two exposed mating surfaces.

The first half is assembled by depositing either reservoir or scavenger material on the surface of backing plate 60. The resulting layer of reservoir material or scavenger material is then cured and/or hydrated (as the case may be), at curing temperatures appropriate to the material used (room temperature to 300° C.), such that the layer is in a solid or semisolid state. This layer can also be processed from a melt state and cooled to form a solid or a semisolid. In the case of reservoir layer 40, it is then subjected to a humid atmosphere typically 40° C. at 50-95% relative humidity, for two to forty-eight hours. The second half is produced by sequentially depositing the electrochromic stack layers onto suitable substrate 10. Then, intermediate layer 30 is applied over the exposed surfaces of stack 20. Intermediate layer 30, which is preferably UV curable is left in an uncured or partially cured liquid, gel or semisolid state, since it becomes one of the two mating surfaces when the two halves meet. This results in an improved seal between the halves and a greater degree of contact between the facing exposed surfaces of the halves. Once the two halves have been joined, the intermediate layer is cured by ultraviolet light, heat, infrared radiation or microwaves. This final curing is preferably done close to room temperature so as to avoid upsetting the moisture content of moisture control layer. Primary seal 70 is then applied, followed by an optional secondary seal 80. Various primer solutions may be applied between coatings to promote adhesion between layers, depending upon the materials used.

CONSTRUCTION OF TEST SAMPLES

Electrochromic mirrors based on the present invention were constructed for testing purposes using the following:

| ENCAPSULANT ELEMENT | MATERIAL |
| --- | --- |
| Substrate 10 and electrochromic stack 20 | Glass coated with electrochromic stack as described above |
| Reservoir material 40 | QUATREX 1010+ JEFFAMINE ED600 (i.e. hydrophilic groups & resin) |
| Intermediate barrier layer 30 | DuPont B565 (discussed above) |
| Primary seal 70 | ER2020 + 2 parts per hundred fumed silica + CATALYST 15 |
| Secondary seal 80 | CR3200 |
| Backing member 60 | Glass |

The edges of glass substrate 60 measuring 76 mm × 70 mm × 1 mm were masked with a polyimide film having a silicone pressure sensitive adhesive backing (i.e. 3M 92 electrical tape).such that an unmasked area measuring 51 mm × 64 mm was formed in the center of the substrate. The unmasked area was then coated with a primer solution to increase the adhesion of the subsequent resins to be deposited on this backing. The primer was made from silanes as is well known in the art. The primer was applied using a cotton swab and air dried for 15 minutes.

The reservoir material 40 was then prepared by combining QUATREX 1010 and Jeffamine ED600 in a ratio of 3 to 2.52 parts by weight, respectively. The mixture was then degassed at 50 torr vacuum, ambient temperature for approximately ten minutes. The reservoir layer was formed by applying the material to the primed glass substrate to a final thickness of about 480 microns. Curing of the reservoir layer followed by heating the sample at 100° C. for one hour followed by 150° C. for thirty minutes. The masking was then removed and edges wiped clean with a solvent. The reservoir layer was activated by placing it in a humidity chamber at 75% RH at 25° C. for twenty-four hours. This resulted in the sample absorbing 3% of its weight of water.

Next the second half was formed. The edges of an ITO substrate of an electrochromic stack 20 of similar dimensions as its glass substrate 10 were masked with the same masking material as used on the first half. The masked edge width was 4 mm wide. Primer was then applied to the ITO coating only around the electrochromic stack, not on the stack. The primer solution consisted principally of silanes to optimize the adhesion between indium tin oxide and the resin. The primer was applied using a cotton swab and air dried for fifteen minutes.

The intermediate barrier layer 30 was then formed by applying DuPont B565 onto the ITO substrate and electrochromic stack to form an "X" pattern, that is each of the two B565 lines extended from one corner of the ITO substrate to an opposing diagonal corner.

The first half (glass backing 60 and activated reservoir layer 40) was then slowly placed on top of the second half (electrochromic stack 20 and B565 layer 30). The first half was oriented above the second half such that the reservoir layer of the first half was facing the intermediate barrier layer of the second half while only one edge of the first half was contacting one edge of the second half. The angle between the two halves was then slowly decreased, while keeping the above mentioned first half edge in contact with the second half in a hinge-like manner. This procedure was continued until the opposing surfaces of the two halves were in full contact with one another. This procedure prevents entrapment of bubbles, i.e. air and spreads the B565 resin layer out over electrochromic stack 20.

Curing of the B565 layer was then performed by passing the encapsulated device through a UV chamber four times, each pass at a speed of 1 cm/sec with the device located 14 cm from the source.

The masking material was removed followed by cleaning the outer surface with toluene. The outer surfaces and edges of both halves were primed with a solution of a silane primer to improve the bonding between the substrates and the primary seal. The primer was applied using a cotton swab and air dried for fifteen minutes.

The primary seal 70 was prepared by mixing ER2020, containing 2% fumed silica with CATALYST 15 in a ratio of 100:9 parts by weight, respectively. The mixture was degassed at 50 torr vacuum at ambient temperature for fifteen minutes. The mixture was then applied to the edges of the electrochromic device with a blade or flat spatula.

Curing occurred by exposure to room temperature for sixteen hours. Finally, a primer coating was applied to the primary seal, the primer consisting of silane to enhance the bonding between the primary and the secondary seals. The coating was then allowed to air dry for fifteen minutes Secondary seal 80 was formed by brushing seal material CR3200 onto the primed primary seal surface. The final assembly was allowed to cure for twenty-four hours at room temperature. The use of the primers is optional and the principal active ingredients, i.e. silanes, may even be incorporated into the resins themselves, thus avoiding a processing step.

Comparative samples were made the same way, except that the reservoir layer 40 was left out of the mirror.

TEST PROCEDURE

The coloring kinetics performance of electrochromic mirrors with and without a moisture control layer 40 and an intermediate layer 30 was evaluated after exposure to the following conditions:

(a) Cycling temperature and humidity:
4 cycles 96 hours, where 1 cycle consists of
4 hours at 90° C., no humidity control
4 hours at −40° C., no humidity control
16 hours at 95–100% RH, 45° C.

(b) 85° C. temperature test

Figure 6:
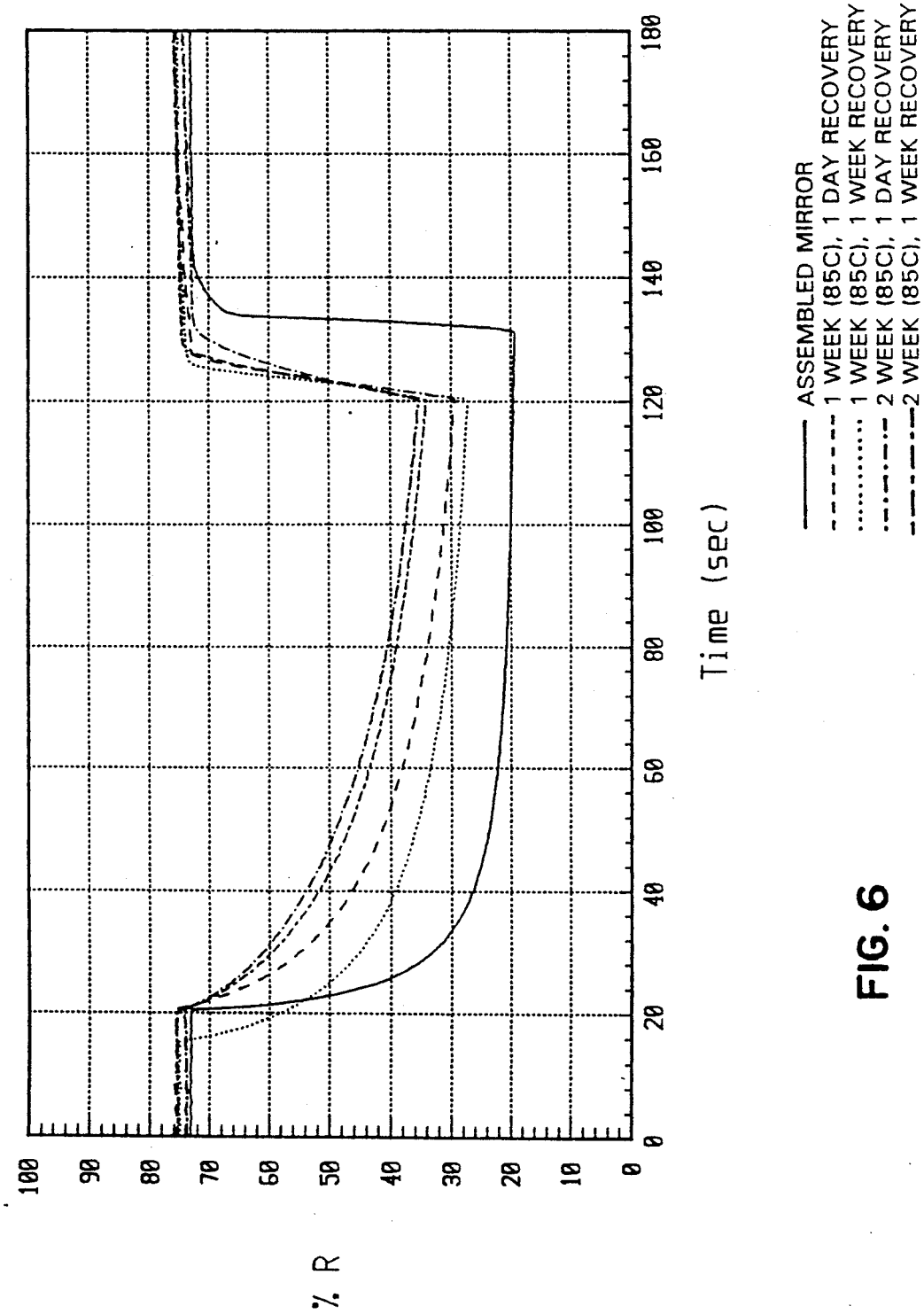
FIG. 6 is a graph illustrating the effects of exposure to 85° C. on the coloring kinetics of an electrochromic mirror which does not include a moisture control (or reservoir) layer.
Figure 7:
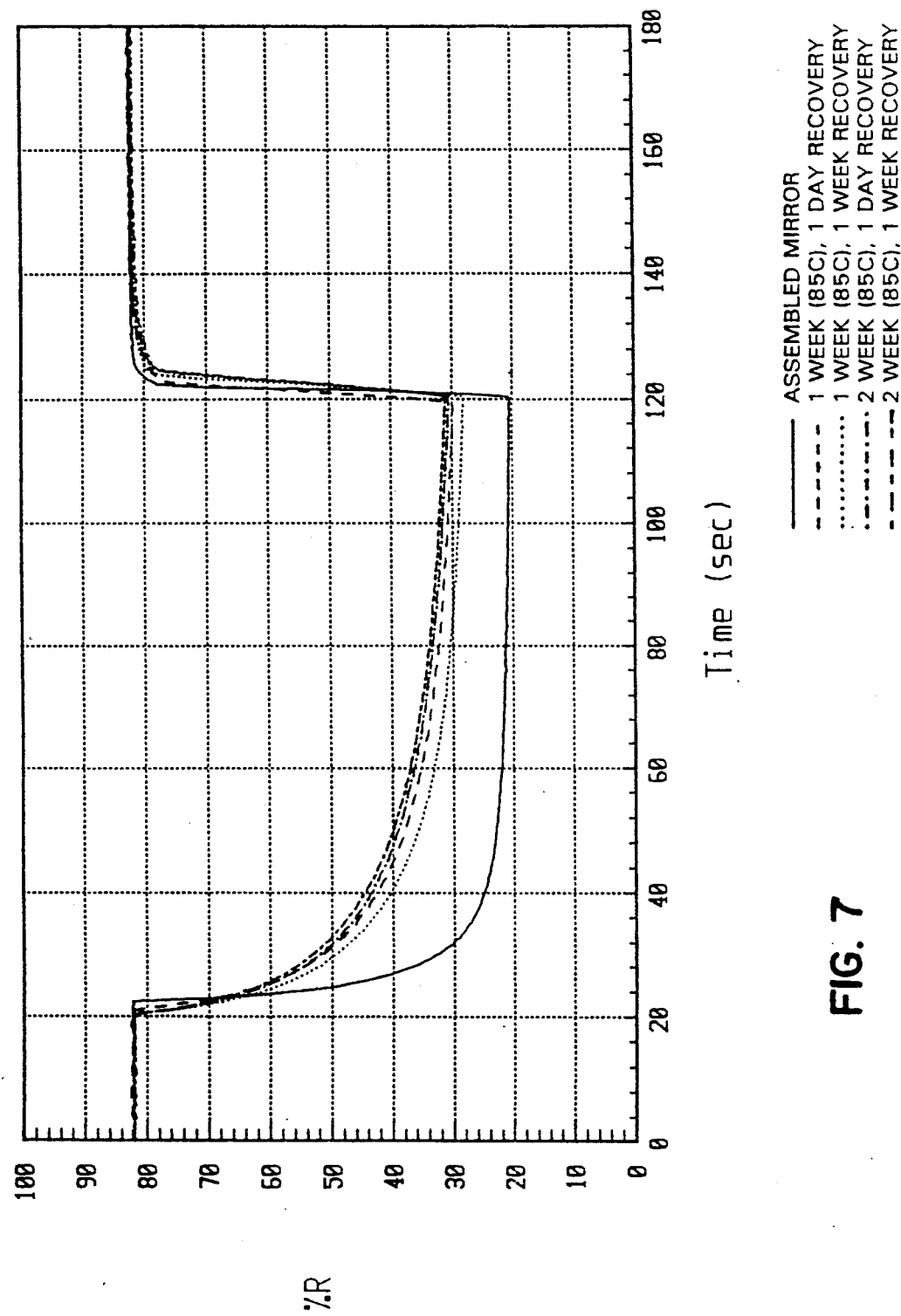
FIG. 7 is a graph illustrating the effects of exposure to 85° C. on the coloring kinetics of an electrochromic mirror which does include both a barrier layer and a reservoir.

The electrochromic stack 20 on its substrate 10 was tested for coloring kinetics prior to completing assembly of the mirror and without subjecting it to the temperature and humidity conditions, in order to provide a base line. In FIGS. 4–7, reflectivity (%R) of a mirror sample is plotted as a function of time, in seconds. Reflectivity measurements (%R) were made in a spectrometer at 550 nm for a period of three minutes. At 20 seconds on the graph, a 1.8 volt potential was applied to the electrochromic stack to color it, making it less reflective. After 120 seconds (150 seconds in the case of the electrochromic stack and substrate of the FIG. 4 mirror), a reverse voltage of −0.8 was applied to cause the electrochromic stack to clear. The same procedure was used on the fully assembled mirror, and also on the fully assembled mirror after exposure to temperature and humidity (FIGS. 4 and 5), and on separate samples, after exposure to high temperature and a recovery period (FIGS. 6 and 7).

Temperature Humidity Exposure

The temperature humidity exposure performed on the test mirrors involved a series of cycles of various temperatures and humidities. Each cycle of the test involved four hours at 90° C. followed by four hours at −40° C. and 16 hours at 45° C., the latter exposure performed at a relative humidity of 95–100%. The complete test took 96 hours and consisted of four of the above cycles.

The mirror without the reservoir layer exhibited a greater decrease in the rate of change of reflectivity after testing than the mirror with the reservoir layer. Although both mirrors displayed diminished performance to varying degrees after the temperature and humidity tests, the mirror having the reservoir layer displayed greater resistance to temperature and humidity effects, and thus greater environmental stability as opposed to the mirror lacking a reservoir layer.

Figure 4:
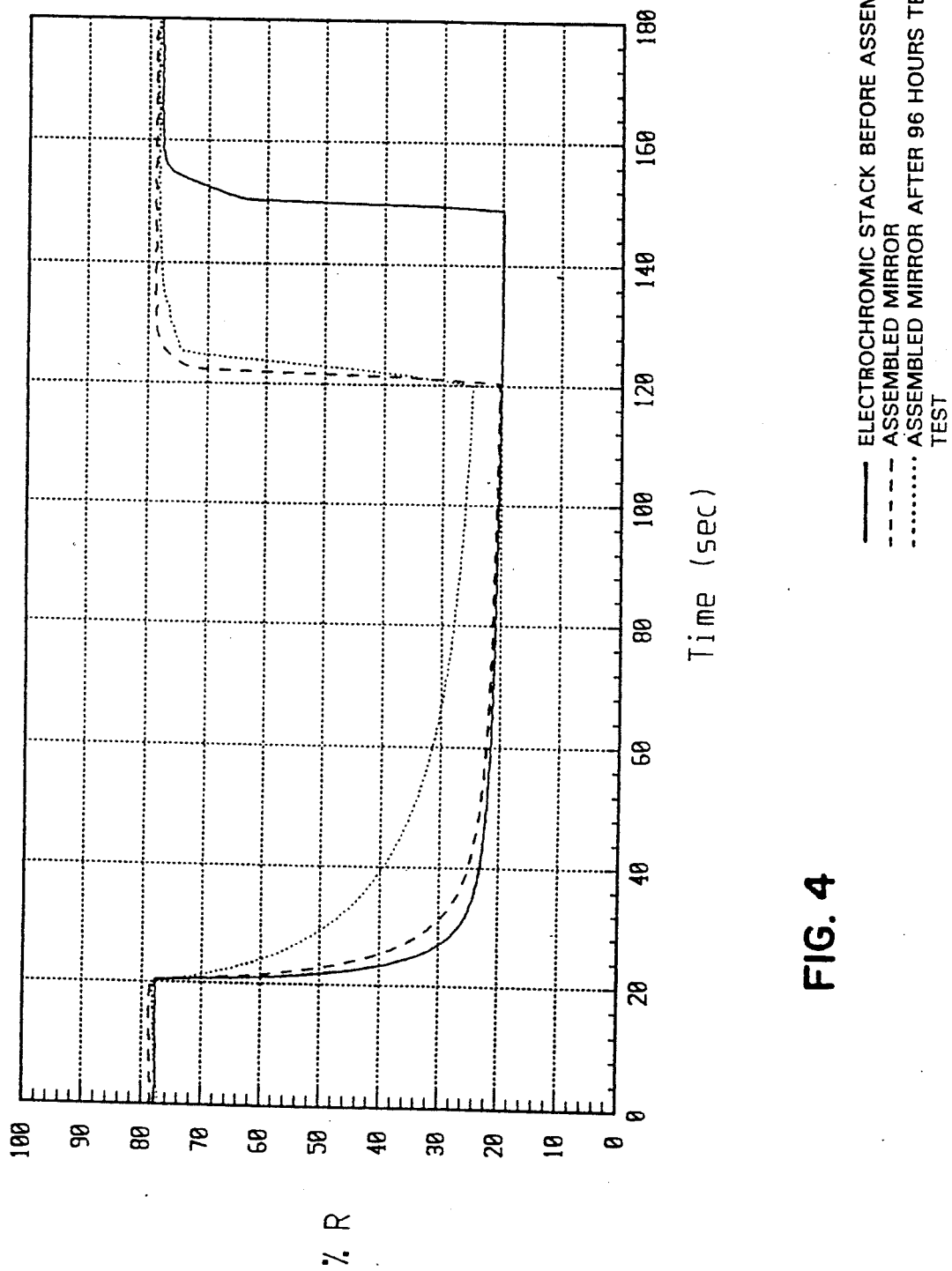
FIG. 4 is a graph illustrating the effects of temperature and humidity on the coloring kinetics of an electrochromic mirror which does not include a moisture control (or reservoir) layer.

In FIG. 4, the performance curves of the mirror sample before and after testing indicate a substantial slow down in the rate of change in reflectivity of the mirror after testing. At the 40 second mark, the reflectivity of the assembled mirror before testing was approximately 25%, whereas after testing the reflectivity was 40% indicating that exposure to temperature and humidity effects results in a slowing of the coloring kinetics of the mirror.

Figure 5:
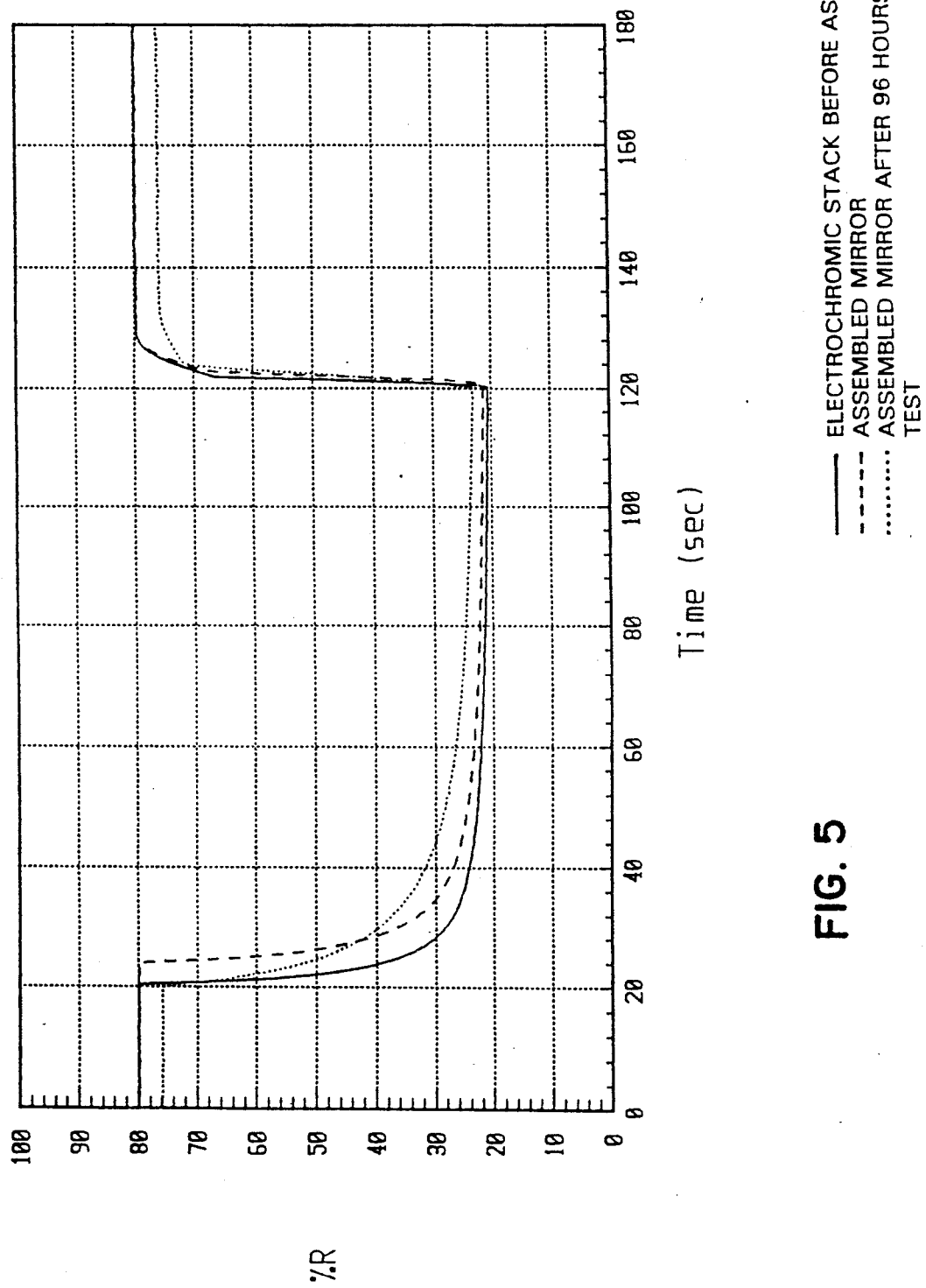
FIG. 5 is a graph illustrating the effects of temperature and humidity on the coloring kinetics of an electrochromic mirror which does include both a barrier layer and a reservoir.

Turning attention to FIG. 5, the before and after temperature and humidity exposure curves for reflectivity verses time for a mirror sample with a reservoir more closely follow one another. The reflectivity of the mirror with a reservoir layer at 40 seconds is approximately 26%, whereas after exposure the sample exhibited a reflectivity of 32% at the 40 second mark. The reservoir and barrier layer combination guards against substantial slowdowns in coloring kinetics, and tends to promote a greater degree of consistency and predictability in the performance of the mirror, as opposed to a mirror lacking such reservoir layer.

85° C. Temperature Exposure

For this test the assembled mirrors were placed in an oven at 85° C. for one week with kinetic coloring testing as described occurring after a one day recovery and after a one week recovery. They were then replaced in the oven at 85° C. for another week and tested again as described above after one day and one week.

FIGS. 6 and 7 illustrate the effects of exposure to a temperature of 85° C. on the coloring kinetics of a mirror without and with a reservoir layer, respectively. In FIG. 6 at the 40 second mark, the encapsulated mirror sample exhibited a reflectivity of 26%, whereas after one week of heating and one week recovery, the reflectivity at 40 seconds was 40%. For the same one week heating but only allowing one day recovery, the reflectivity at 40 seconds was 46%. Heating the mirror sample for another week for a total of two weeks heating, resulted in reflectivities of about 52% and 54%.

When a reservoir layer is incorporated into the mirror, greater resistance to temperature effects is displayed. In FIG. 7 at the 40 second mark, a mirror having a reservoir layer displayed a reflectivity of approximately 25% before exposure to temperature and humidity testing. After testing the sample exhibited only a slight variation in the reflectivity at the 40 second mark regardless of the time period of exposure to heat or time period of recovery. The reflectivities measured after testing were all in a range from about 40% to about 45%. Thus, incorporation of the reservoir layer into the encapsulated mirror sample resulted in a lesser degree of slowdown in coloring kinetics and a much greater degree of consistency of performance after testing than without the reservoir layer.

CONCLUSION

Those skilled in the art will appreciate that routine experimentation will be required to determine appropriate thicknesses for the barrier and moisture control layers when made using the various types of materials described above. Similarly, some of the materials suggested will be more effective than others. In the case of some materials, the moisture control layer and the barrier layer may in the first instance impede the performance of the mirror. However the presence of the combination of the two will cause the mirror to respond more consistently after exposure to heat and humidity, such consistency being an important virtue in such a product.

Of course, it is understood that the foregoing merely notes preferred embodiments of the invention and that various changes and alterations can be made without departing from the spirit and broader aspects thereof as set forth in the appended claims, which are to be interpreted in accordance with the principles of patent law, including the doctrine of equivalents.

The embodiments of the invention in which an exclusive property of privilege is claimed are defined as follows:

1. An electrochromic device which can be alternatively darkened or lightened comprising:
   a substrate layer;
   an electrochromic stack deposited upon said substrate layer;
   a water resistant, moisture permeable intermediate barrier layer overlying said electrochromic stack;
   a moisture control layer comprising one of a water reservoir material and a water scavenger material, said water reservoir material being hydrophilic in nature such that if sufficiently hydrated said water reservoir material may provide a source of water for said electrochromic device, said water scavenger material providing means to collect and bind water within said electrochromic device, said moisture control layer overlying said intermediate layer; and
   means for hermetically sealing said electrochromic device.

2. An electrochromic device in accordance with claim 1, in which said sealing means comprises a primary seal, overlying said moisture control layer and a secondary seal applied over and in contact with said primary seal, said secondary seal providing means for additional protection from environmental and mechanical damage.

3. An electrochromic device in accordance with claim 1 wherein said sealing means comprises a backing plate overlying said moisture control layer.

4. An electrochromic device in accordance with claim 1 wherein said moisture permeable intermediate barrier layer has a water permeability in the range of 0.005 to 10 mg/cm-mm$^2$-day.

5. An electrochromic device in accordance with claim 1 wherein said moisture permeable intermediate barrier layer is comprised of a shock absorbing material for providing protection to said electrochromic stack.

6. An electrochromic device in accordance with claim 1 wherein said moisture permeable intermediate barrier layer is comprised of a material curable upon exposure to at least one of ultraviolet light, heat, infrared radiation, and microwaves.

7. An electrochromic device in accordance with claim 1 wherein said moisture permeable intermediate barrier layer is applied to a thickness of about 0.001 to 5 mm.

8. An electrochromic device in accordance with claim 1 wherein said moisture permeable intermediate barrier layer is comprised of one or more materials selected from the group consisting of; organo-ceramics, epoxies, urethanes, ureas, acrylics, polyesters, silicones, vinyls, amides, imides and sulfones.

9. An electrochromic device in accordance with claim 1 utilizing said water reservoir material, wherein said water reservoir material has an initial water content in the range of about 0.005 mg to 5 mg of water per cm$^2$ of area of said electrochromic stack and said reservoir material having a thickness of about 0.002 mm to about 5 mm.

10. An electrochromic device in accordance with claim 1 utilizing said water reservoir material, wherein said water reservoir material is applied to a thickness of about 0.002 mm to about 5 mm.

11. An electrochromic device in accordance with claim 1 utilizing said water reservoir material, wherein said water reservoir material is comprised of a hydrophilic filler dispersed within at least one of a thermosetting and a thermoplastic resin.

12. A water reservoir material in accordance with claim 11, wherein said water reservoir material is comprised of a cross-linked polyacrylamide in a silicone resin.

13. An electrochromic device in accordance with claim 1 utilizing said water reservoir material, wherein said water reservoir material is comprised of a hydrophilic polymeric material dispersed within a standard resin;
   said hydrophilic polymeric material comprising at least one of the following hydrophilic groups; amines, amides, hydroxides, carboxylic acids, acids, sulfones and ethylene-oxide based polyethers.

14. A water reservoir material in accordance with claim 13, wherein said water reservoir material is comprised of a water soluble amine dispersed in a standard epoxy resin.

15. An electrochromic device in accordance with claim 1 utilizing said water scavenger material, wherein said water scavenger material absorbs up to 50% of said material's weight of water.

16. An electrochromic device in accordance with claim 1 utilizing said water scavenger material, wherein said water scavenger material is applied to a thickness of about 0.002 mm to about 5 mm.

17. An electrochromic device in accordance with claim 1 utilizing said water scavenger material, wherein said water scavenger material is comprised of one or more materials selected from the group; epoxies, urethanes, ureas, acrylics, polyesters, amides, silicones, vinyls and imides.

18. A method of assembling an electrochromic device which can be alternatively darkened or lightened comprising:
   forming an electrochromic stack onto a substrate;
   depositing a water resistant, moisture permeable intermediate barrier layer onto said electrochromic stack whereby said intermediate layer is left uncured in its liquid or semisolid state, thereby forming a first half of said electrochromic device;
   depositing a moisture control layer comprising one of a water reservoir material and a water scavenger material, said water reservoir material being hydrophilic in nature such that if sufficiently hydrated said water reservoir material may provide a source of water for said electrochromic device, said water scavenger material providing means to collect and bind water within said electrochromic device, onto the surface of a backing plate;
   curing said moisture control layer deposited upon said backing plate to form a second half of said electrochromic device;
   mating said first half and second half of said electrochromic device by contacting the exposed surface of said uncured intermediate layer of said first half to the exposed surface of said cured moisture control layer of said second half;
   curing said intermediate layer; and
   hermetically sealing said electrochromic device by applying a seal material onto said backing plate to constitute a primary seal.

19. A method of assembling an electrochromic device in accordance with claim 18, such that subsequent to mating of said halves, said moisture permeable intermediate barrier layer is cured by exposure to at least one of ultraviolet light, heat, infrared radiation, and microwaves.

20. A method of assembling an electrochromic device in accordance with claim 18 utilizing said water reservoir material, wherein said water reservoir material is hydrated by exposure to a high humidity environment.

21. A method of assembling an electrochromic device in accordance with claim 18 further comprising applying a secondary seal onto said primary seal.

22. A method of assembling an electrochromic device which can be alternatively darkened or lightened comprising:
  forming an electrochromic stack onto a substrate;
  depositing a water resistant, moisture permeable intermediate barrier layer onto said electrochromic stack;
  applying a moisture control layer comprising one of a water reservoir material and a water scavenger material, said water reservoir material being hydrophilic in nature such that if sufficiently hydrated said water reservoir material may provide a source of water for said electrochromic device, said water scavenger material providing means to collect and bind water within said electrochromic device, onto said intermediate layer; and
  hermetically sealing said electrochromic device.

23. A method of assembling an electrochromic device in accordance with claim 22, wherein said hermetically sealing step comprises incorporating a backing plate over said moisture control layer.

24. A method of assembling an electrochromic device in accordance with claim 23 utilizing said water reservoir material wherein said water reservoir material is hydrated by exposure to a high humidity environment.

25. A method of assembling an electrochromic device in accordance with claim 22 wherein said hermetically sealing step comprises applying a primary seal to said moisture control layer and applying a secondary seal over and in contact with said primary seal, said secondary seal providing additional protection from environmental and mechanical damage.

26. A method of assembling an electrochromic device in accordance with claim 25 utilizing said water reservoir material, wherein said water reservoir material is hydrated by exposure to a high humidity environment.

* * * * *

UNITED STATES PATENT AND TRADEMARK OFFICE
CERTIFICATE OF CORRECTION

PATENT NO. : 5,216,536
DATED : Jun. 1, 1993
INVENTOR(S) : Anoop Agrawal et al

It is certified that error appears in the above-indentified patent and that said Letters Patent is hereby corrected as shown below:

Column 5, line 25
After "stack 20" insert -- . --;

Column 6, line 21
After "hydrated" insert -- . --;

Column 7, line 68
"lectrochromic" should be --electrochromic--;

Column 8, line 29
After "permeability" insert -- . --;

Column 10, line 65
After "minutes" insert -- . --;

Column 12, line 67
"property of" should be --property or--;

Column 4, line 61
After "typical" insert --layer--;

Signed and Sealed this

Thirty-first Day of May, 1994

Attest:

BRUCE LEHMAN

Attesting Officer

Commissioner of Patents and Trademarks